June 7, 1966　　J. A. MARLAND ETAL　　3,254,778
DRIVE MECHANISM FOR ROLLER HEARTH FURNACE
Filed March 6, 1964　　11 Sheets-Sheet 1
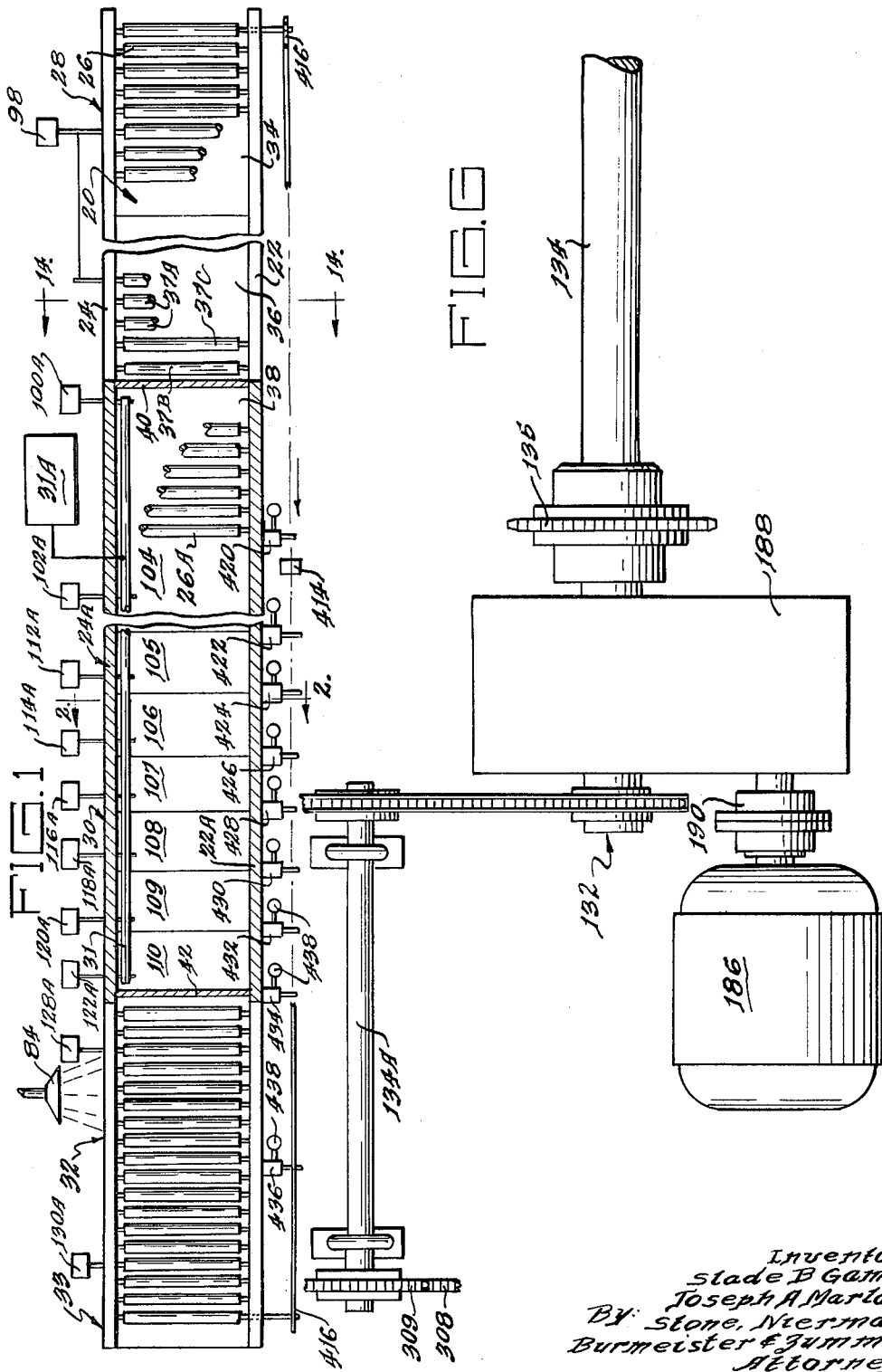
Inventors
Slade B Gamble
Joseph A Marland
BY Stone, Nierman,
Burmeister & Zummer
Attorneys

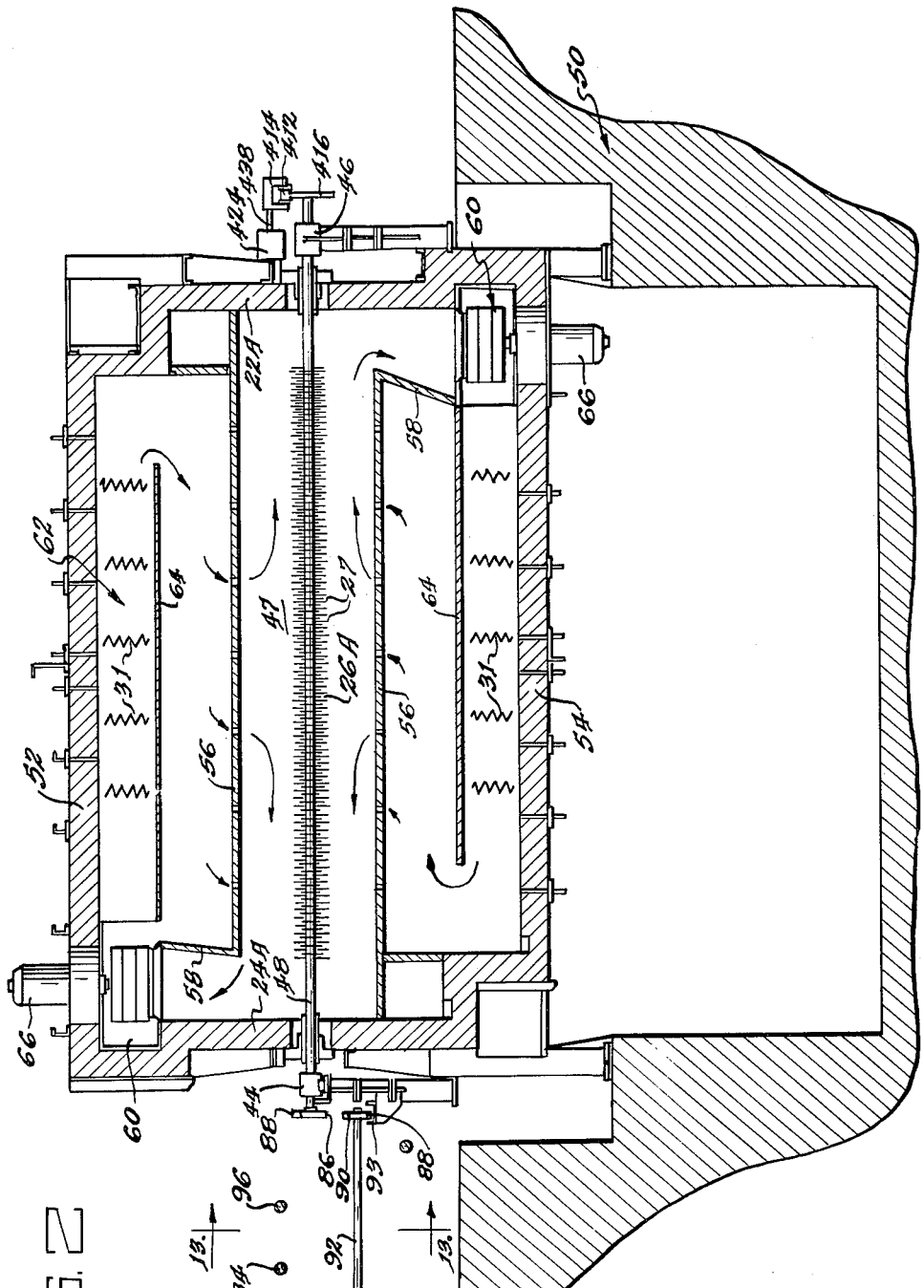

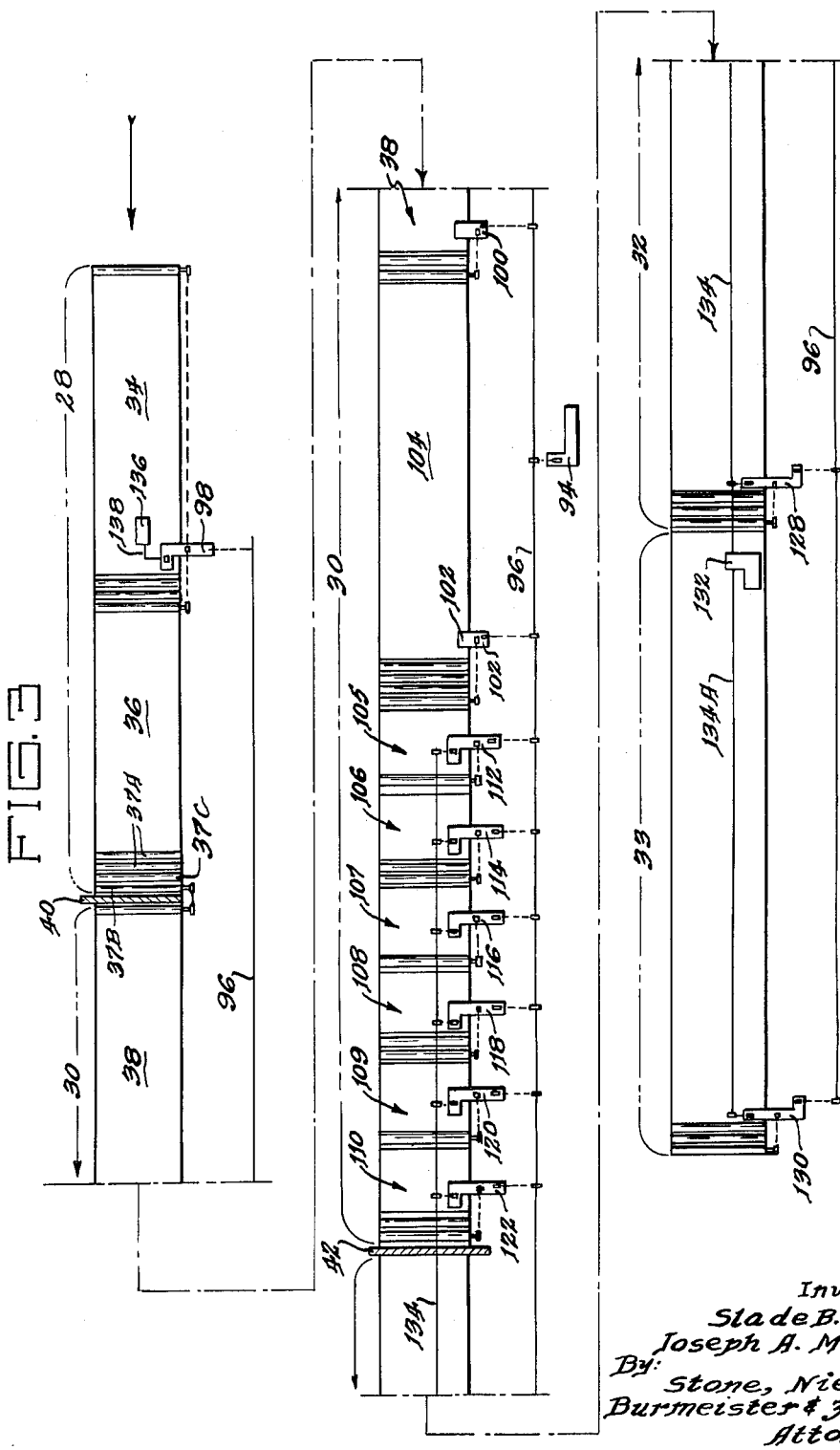

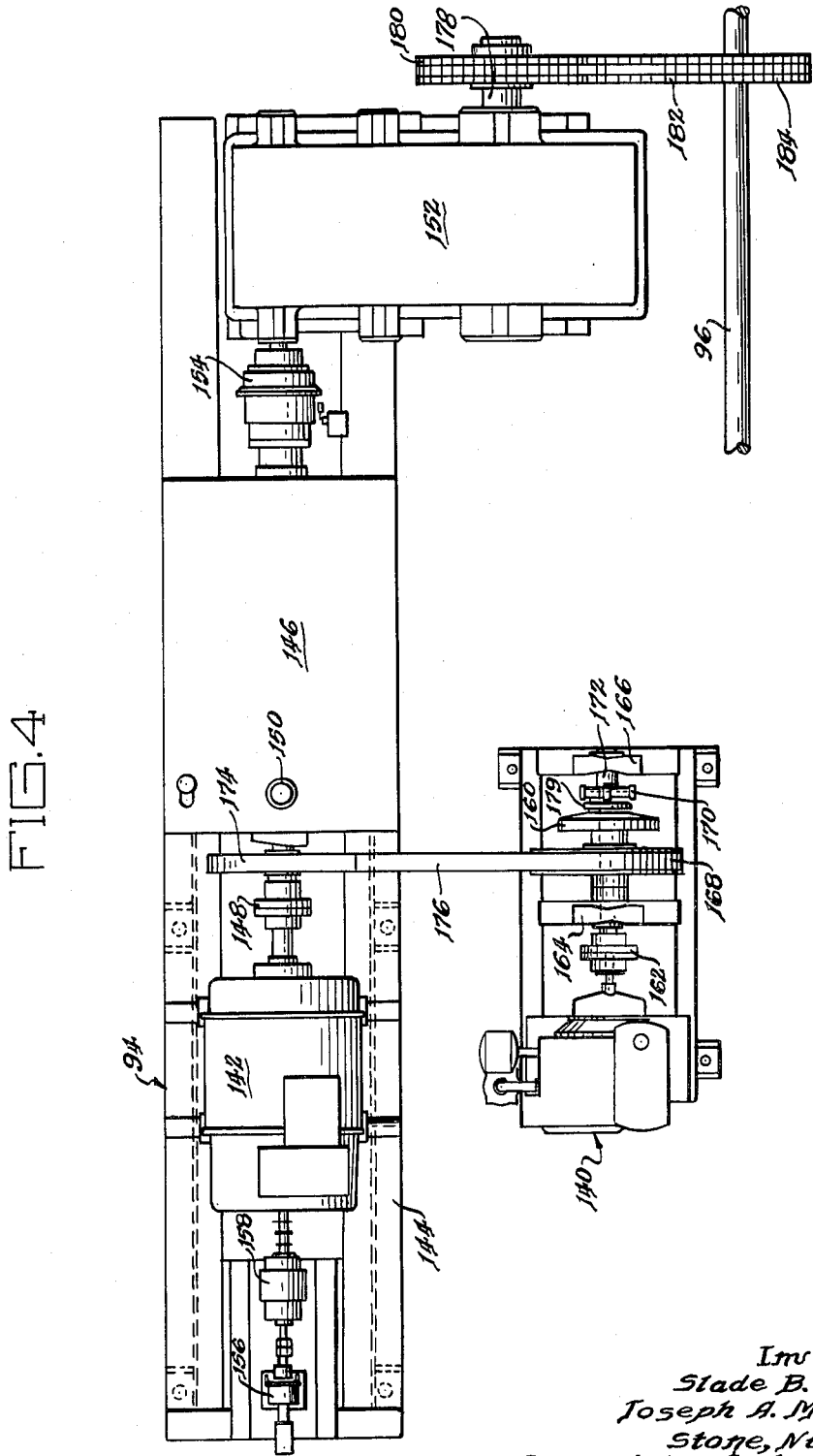

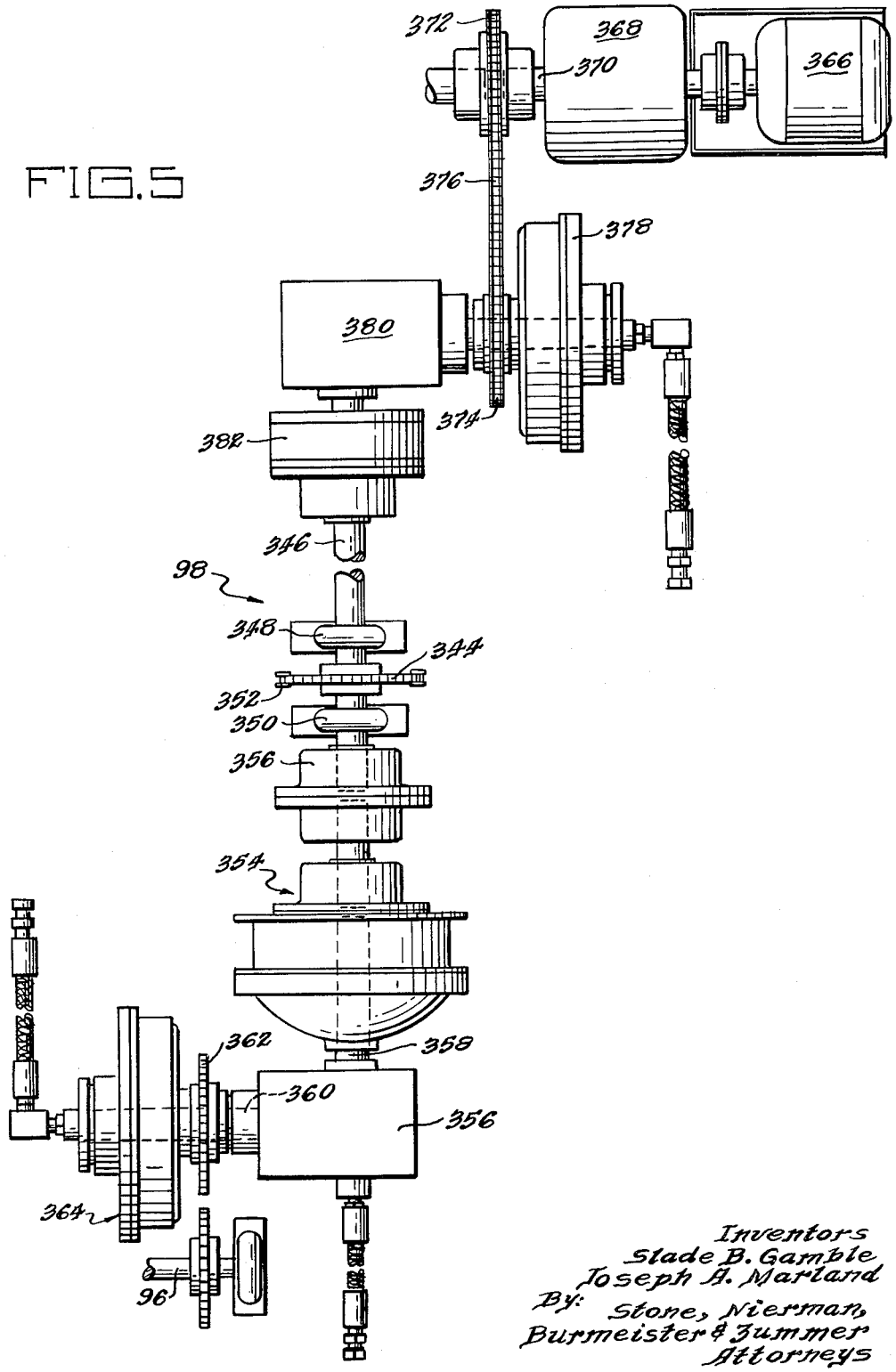

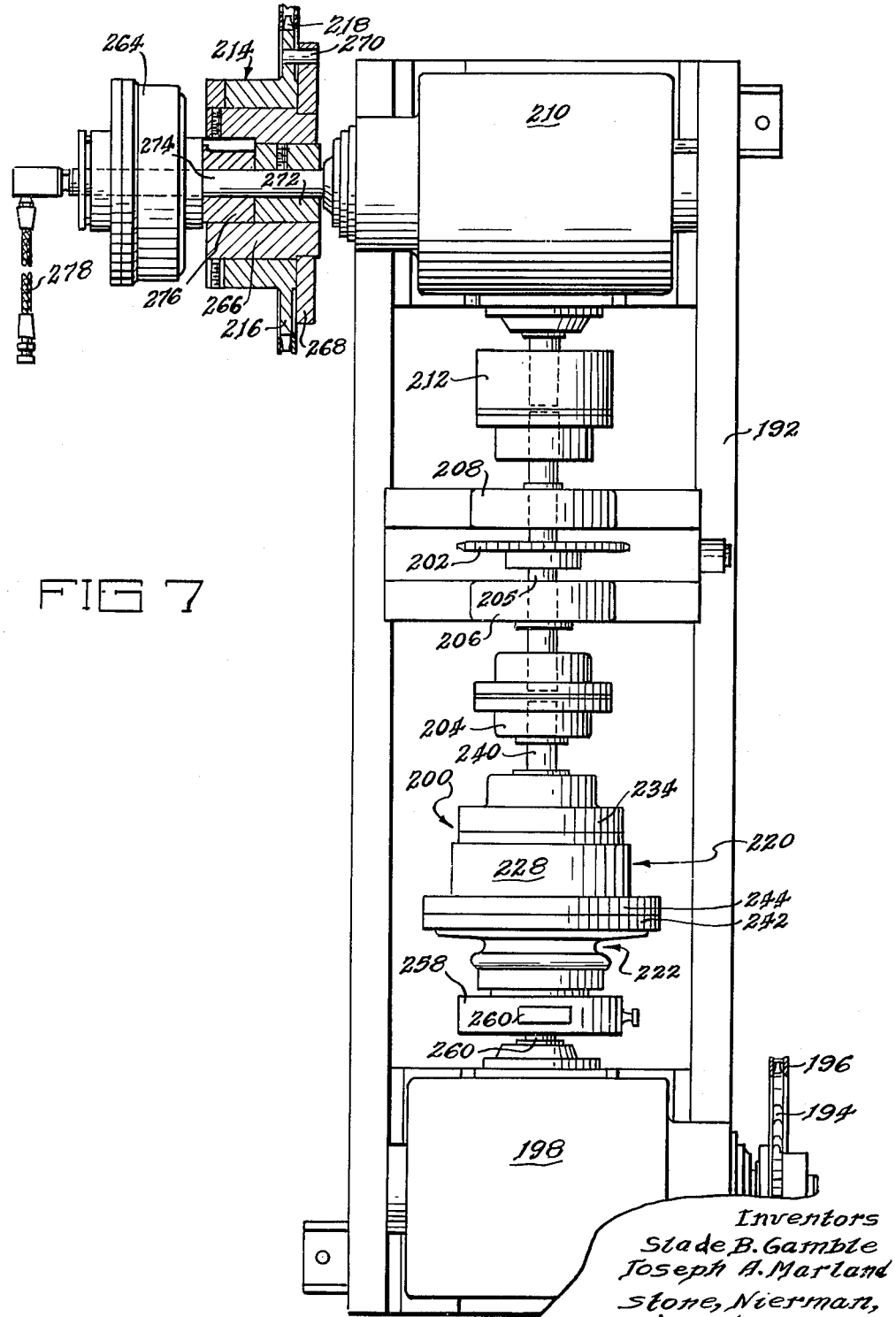

June 7, 1966 J. A. MARLAND ETAL 3,254,778
DRIVE MECHANISM FOR ROLLER HEARTH FURNACE
Filed March 6, 1964 11 Sheets-Sheet 7

Inventors
Slade B. Gamble
Joseph A. Marland
By: Stone, Nierman,
Burmeister & Zummer
Attorneys

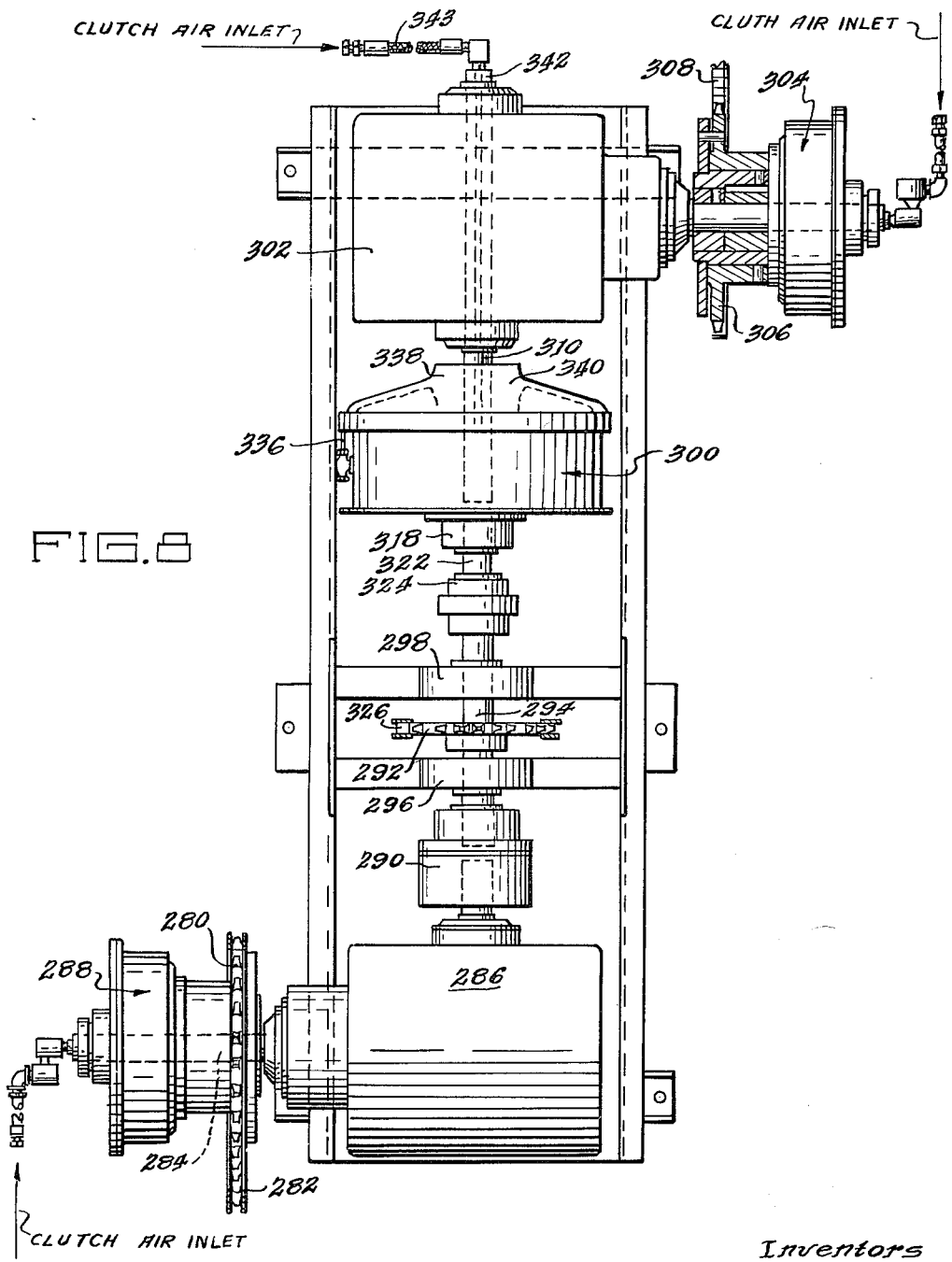

June 7, 1966  J. A. MARLAND ETAL  3,254,778
DRIVE MECHANISM FOR ROLLER HEARTH FURNACE
Filed March 6, 1964  11 Sheets-Sheet 9
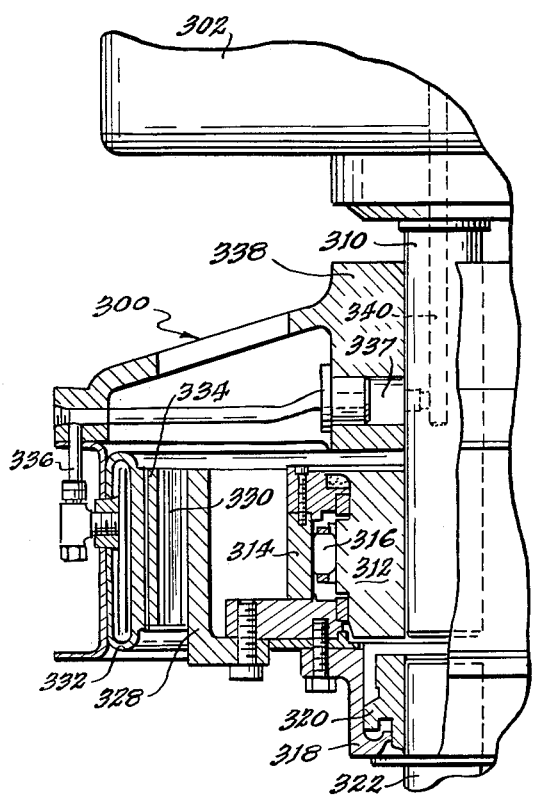
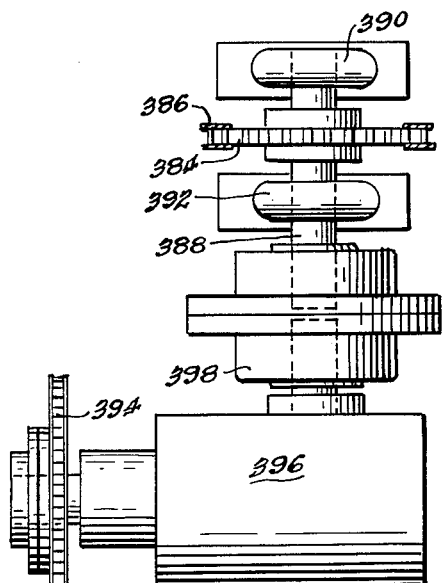
Inventors
Slade B. Gamble
Joseph A. Marland
By: Stone, Nierman,
Burmeister & Zummer
Attorneys

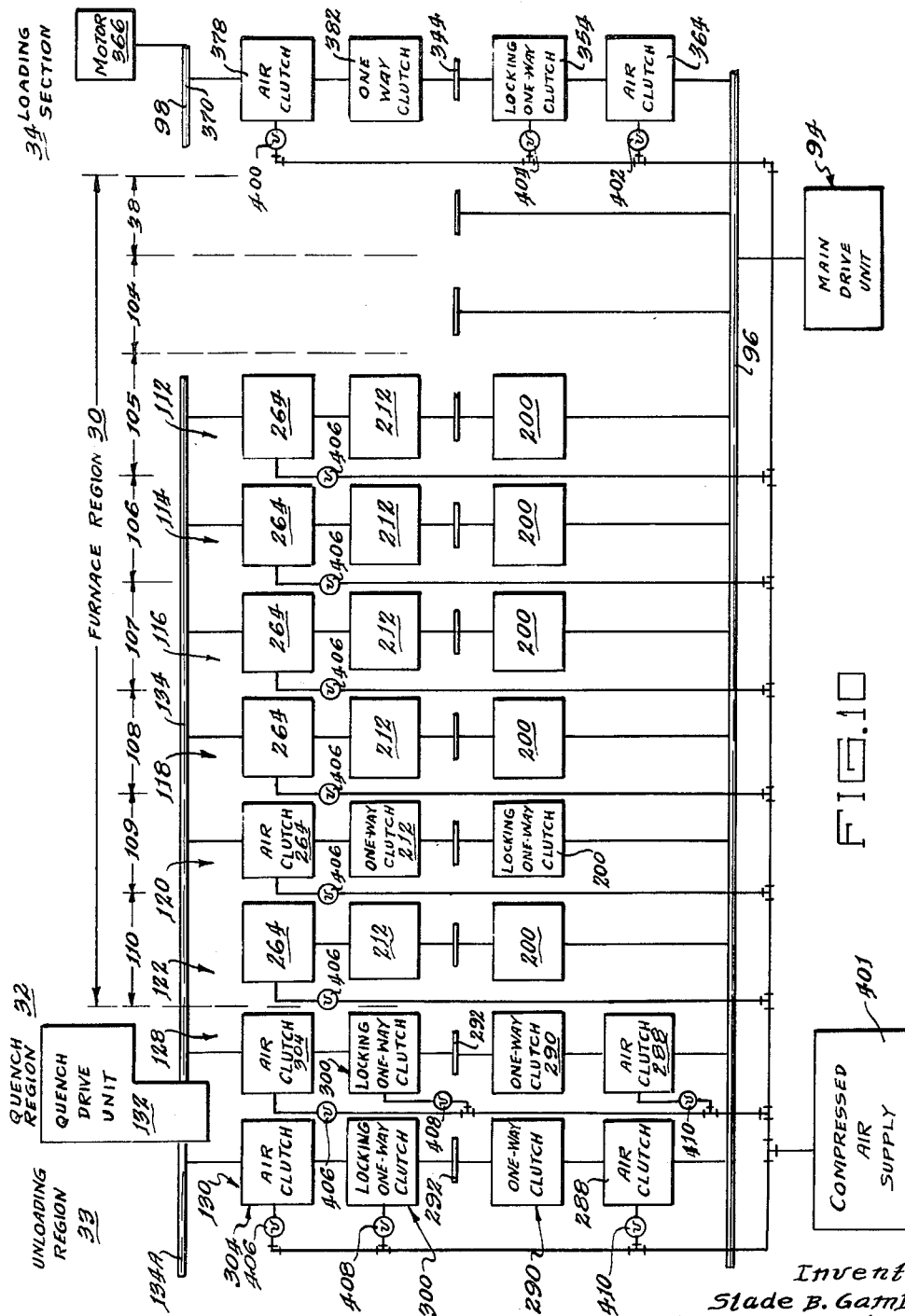

June 7, 1966  J. A. MARLAND ETAL  3,254,778
DRIVE MECHANISM FOR ROLLER HEARTH FURNACE
Filed March 6, 1964  11 Sheets-Sheet 11
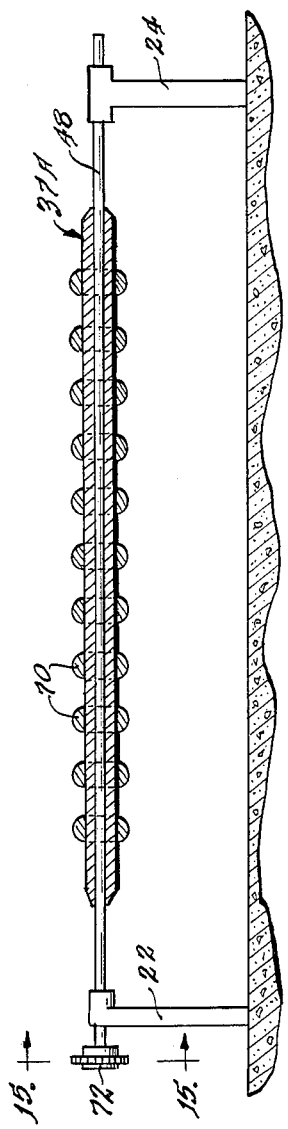
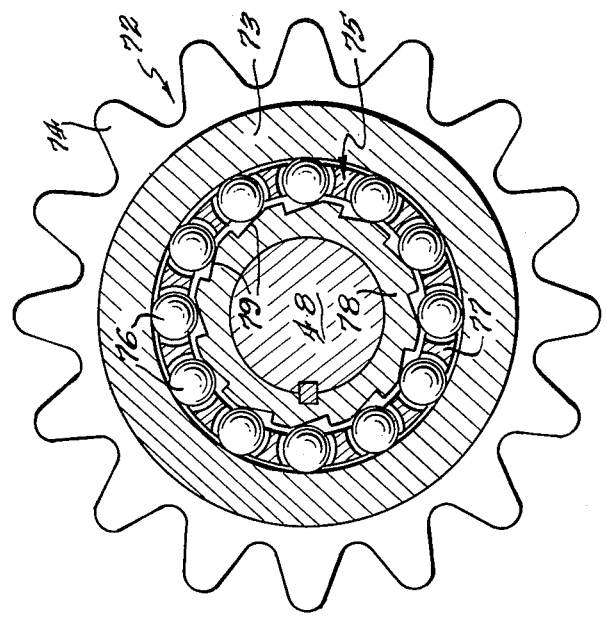
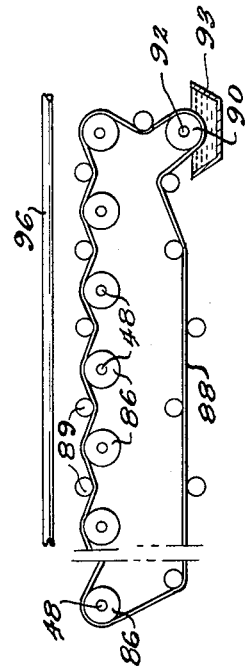
Inventors
Slade B. Gamble
Joseph A. Marland
By: Stone, Nierman,
Burmeister & Zimmer
Attorneys

United States Patent Office

3,254,778
Patented June 7, 1966

3,254,778
DRIVE MECHANISM FOR ROLLER HEARTH FURNACE
Joseph A. Marland, La Grange, Ill., and Slade B. Gamble, Oconomowoc, Wis., assignors to Marland Foundation, a non-profit corporation of Illinois
Filed Mar. 6, 1964, Ser. No. 349,883
31 Claims. (Cl. 214—18)

The present invention relates to a drive mechanism for roller hearth furnaces and to methods of heat treating charges on roller hearth furnaces.

Roller hearth furnaces long have been used for treating metal work pieces, as shown by Patent No. 1,969,708 to Betke dated August 7, 1934. In the Betke patent, a charge or work piece is positioned on a loading apparatus, translated through a preheat chamber, a high heat chamber, and exits from the high heat chamber to a run-out table. From the run-out table, the charge is moved to a quench tank and hence to a discharge rack.

During different stages of the heat treating cycle, the charge must be translated at different rates of speed. The charge is carried on a roller table through the various stages of the process, and it must be possible to vary the speed of different sections of the roller table over a wide ratio. In addition, it must be possible to reverse the direction of the work piece, and to periodically change the direction or waltz the charge back and forth in certain stages of the heat treating process.

In the example in this specification of the process carried out by a roller hearth furnace and drive mechanism constructed in accordance with the present invention, the charge is first loaded on to a loading section of the roller bed. From its loading section, the charge is translated into the furnace sections, where the heat treatment takes place. During this portion of the process, the charge is generally continuously translated to the exit of the furnace sections although it must be possible to reverse the direction of the charge. Thereafter, the charge is speeded up and translated through a number of sections of the roller bed within the furnace which are independently and separately controlled. Thereafter, the charge is translated into a quench section, and the charge may be waltzed back and forth in the quench section as water is sprayed upon the charge. Thereafter, the charge is translated from the quench section to the unloading section, and the charge is removed from the roller bed as a completed product and permitted to cool.

Roller beds prior to the present invention have been limited as to the speed range attainable. Further, roller beds prior to the present invention required interruption of the flow of power to the roller bed for the shifting of gears and the like to achieve acceleration over the speed range required. It is an object of the present invention to provide a drive mechanism for a roller bed which is capable of varying the translation rate of the charge over a wide range and to do so without any interruption in the continuous flow of power to the work table.

If the rollers in one portion of the roller bed tend to move at a more rapid rate than in another portion of the roller bed, the charge will be placed under tension or compression. The charge is often a thin sheet of metal, such as aluminum, and unless the rollers of the roller bed rotate in synchronism undesirable marking and other defects are produced in the charge. It is, therefore, a further object of the present invention to provide a drive mechanism for a roller bed in which a charge may be translated along the bed without being subjected to strains and force is not transmitted from roller to roller through the work piece.

It is also an object of the present invention to provide a roller bed capable of translating a charge at a highly constant rate. For heat treating of metal plate, it has been found that the rotation rate of the rollers of a roller bed must be maintained at a rate closely approaching a constant value to achieve best results.

Another object of the present invention is to provide a roller hearth furnace capable of increased production when handling charges of different or varying lengths.

In accordance with the present invention, two separate variable speed motors are utilized to drive a given section of the roller bed through one-way clutches. As a result, the motor operating at the higher rate actually drives the roller bed, and the other motor may be engaged to drive the roller bed without any jerking by simply accelerating the motor to achieve the higher rate. Further, in accordance with the present invention, a means is provided for locking one of the one-way clutches so that the charge may be reversed, and hence waltzed upon command.

These and further objects of the present invention will become readily apparent to those skilled in the art from a further consideration of this disclosure, particularly when viewed in the light of the drawings, in which:

FIGURE 1 is a scehmatic view of a roller hearth furnace constructed according to the teachings of the present invention, the view showing the roller bed in horizontal plan, and the furnace in section;

FIGURE 2 is a sectional view of a preferred construction of a furnace section of the roller hearth furnace, the view being taken along the line 2—2 of the schematic view of FIGURE 1;

FIGURE 3 is a diagrammatic view of the drive mechanism for the roller bed of the preferred construction of a roller hearth furnace illustrated in FIGURE 2;

FIGURE 4 is a plan view illustrating the main drive unit of the drive mechanism for the roller bed identified in FIGURE 3;

FIGURE 5 is a plan view of the loading drive unit for the preferred construction of the roller bed identified in FIGURE 3;

FIGURE 6 is a plan view of the quench drive unit of the preferred roller bed drive mechanism identified in FIGURE 3;

FIGURE 7 is a plan view, partly broken away and in section, of one of the drive units for use in the quench speed-up portion of the roller bed identified in FIGURE 3;

FIGURE 8 is a plan view, partly broken away and in section of one of the drive units for the quench table identified in FIGURE 3;

FIGURE 9 is a plan view of one of the drive units employed for a furnace section of the roller bed identified in FIGURE 3;

FIGURE 10 is a diagrammatic view illustrating the control system for the drive mechanism for the roller bed of the preferred construction of FIGURE 3;

FIGURE 12 is an enlarged fragmentary sectional view of one of the one-way clutches illustrated in FIGURE 8;

FIGURE 13 is a sectional view taken along the line 13—13 of FIGURE 2;

FIGURE 14 is a sectional view taken along the line 14—14 of FIGURE 1; and

FIGURE 15 is a sectional view taken along the line 15—15 of FIGURE 14.

Figure 7A:
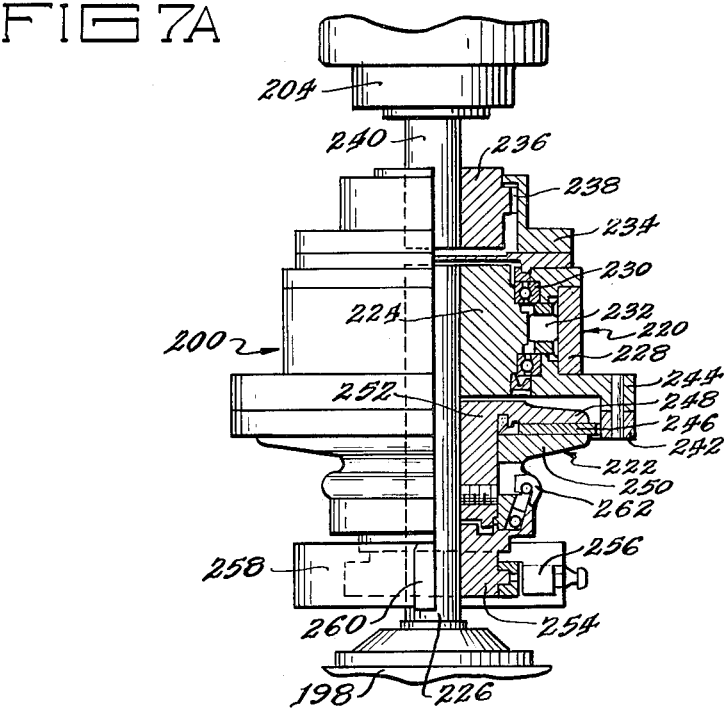
FIGURE 7A is an enlarged view partially in section of the one-way clutches of FIGURE 7.

FIGURE 1 schematically illustrates a preferred construction of heat treating apparatus which embodies the present invention. The heat treating apparatus comprises a continuous flat roller bed 20, which is mounted on a foundation in the form of a pair of parallel walls 22 and 24. The roller bed 20 contains a plurality of parallel rollers 26 which extend normally between the walls 22 and 24 in a common horizontal plane. The rollers 26 are rotated by a drive mechanism which constitutes a part of the present invention, and a charge may be placed upon the rollers and translated therealong in accordance with heat treating processes known prior to the present invention, such as that described in Patent No. 1,969,708 of Betke.

The roller bed 20 traverses four principal regions, a loading region designated 28, a furnace region designated 30, a quenching region designated 32 and an unloading region designated 33. The loading region 28 has two sections 34 and 36 and is of sufficient length to permit a plurality of batches of material to be treated or to handle an extremely long sheet of material to be treated. The rollers of section 34 are driven and all but the last two rollers of section 36 are driven through one way clutches, these rollers being designated 37A. The roller immediately adjacent to the furnace section is designated 37B and is driven with the rollers in the furnace section, and a single roller 37C between the rollers 37A and 37B is an undriven idler roller. The entire loading region 28 is open and accessible from the surroundings for the purpose of placing a charge on the roller bed.

As illustrated in FIGURES 1 and 2, the furnace region 30 has walls 22A and 24A, which extend upwardly from the roller bed 20 and form an enclosed furnace. The furnace region 30 is provided with a heating means, such as electric resistance elements 31, and temperature control means 31A which is adequate for the processes to be carried out. A door 40 is disposed between the loading region 28 and the furnace region 30, and a second door 42 is disposed between the furnace region 30 and the quenching region 32.

FIGURE 2 illustrates a section through the furnace region 30 of a preferred construction of the present invention. The rollers within the furnace region, designated 26A, are mounted on bearings 44 and 46 in the walls 24A and 22A, respectively, and the rollers 26A are disposed within a chamber 47. The rollers 26A within the furnace region 30 may be identical to the rollers 26 in the loading region 28, but preferably are of the type disclosed in Patent No. 2,883,172 to Mitchell. For this reason the rollers in the furnace region 30 are illustrated with radial flexible bristles 27 which extend outwardly from an axial shaft 48 and support the work piece. The shaft 48 and bristles 27 are constructed of alloy steel in order to maintain a cylindrical external surface and the ends of each of the axial shafts 48 is rotatably disposed within the bearings 44 and 46. The walls 22A and 24A are mounted on a concrete foundation 50. The walls 22A and 24A support a roof 52 and a floor 54 for the chamber 47. A perforated plate 56 extends from the wall 22A parallel to the plane of the roller bed and terminates at a distance from the wall 24A. The plate 56 is sealed to a wall 58 which forms a duct communicating with a squirrel cage blower 60 mounted in the roof 54 adjacent to the wall 24A. The blower 60 communicates with the region 47 between the perforated plate 56 and the roller bed, and transfers air from this region to a heating chamber 62 disposed adjacent to the roof 52. The Chamber 62 has a separator 64 in the form of a plate extending parallel to the roof 52 from the wall 24A and blower 60. The heating elements 31, diagrammatically shown in FIGURE 2, are disposed within the heating chamber 62, and a motor 66 coupled to the squirrel cage blower 60 forces air through the heaters 31 and into the plenum chamber formed between the separator 64 of the perforated plate 56, as indicated by the arrows in FIGURE 2.

An identical construction is illustrated for the region below the roller bed, and the same reference numerals 64, 56, and 58, have been used to designate this region. It will be noted that the heated air traverses the surface of any material on the roller bed and divides between the two blowers 60 illustrated in FIGURE 2.

As indicated in FIGURE 1, both the loading section and the quenching section are open to the ambient atmosphere, that is, the walls 22 and 24 do not extend above bearings 44 which support the rollers. In the quenching section, a plurality of sprays, diagrammatically illustrated at 84, connected to a source of water are directed onto the roller bed 20 for the purpose of spraying water on the work piece on the roller bed for the purpose of cooling the work piece.

It will be noted from FIGURES 2 and 13 that a sprocket 86 is mounted on one end of each shaft 48 of each roller 26. In each section of the roller bed, the sprockets 86 are interconnected by a link chain 88 which rides on the top of each sprocket 86 and is maintained in contact by dimpling idlers 89. The rollers 26 of each section of the roller bed are thus driven at the same rotational rate within the limitation of the sprocket and chain drive mechanism. Also, each section of the roller bed 20 is coupled to the drive mechanism, to be described hereafter, by means of a second sprocket 90, which is mounted on a shaft extension 92. In this manner, drive to this particular section of the roller bed 20 is achieved through the sprocket 90. A lubrication tray 93 containing a body of oil is disposed below and adjacent to each sprocket 90.

FIGURES 14 and 15 illustrate the rollers 37A of the loading section 36. These rollers have a smaller diameter than the rollers 37B or the rollers 36A of the furnace section, and toroids of compliant material, such as plastic or rubber, are mounted at spaced intervals on the rollers to provide good frictional engagement between the work piece and the rollers, the toroids being designated 70. A sprocket and one-way clutch assembly 72 couples the shaft 48 of these rollers 37A to the same drive mechanism as the rollers in the section 34, but the one-way clutch and sprocket assembly 72 will only transmit power to the rollers 37A during periods in which the work piece is being translated at a rate no faster than the rotation rate of the rollers of section 34. If the work piece is translated at a more rapid rate, the work piece will transmit rotational torque to the rollers 37A to drive these rollers at the rate of the work piece.

FIGURE 15 illustrates the construction of the sprocket and one-way clutch assembly 72. The sprocket is mounted on the outer race 73 and designated 74. The inner surface of the outer race is cylindrical in form, and surrounds a roller bearing cage 75 which contains a plurality of spaced parallel rollers 76 and intervening spacers 77. An inner race 78 is disposed within the roller-bearing cage 75 and keyed to the shaft 48. The inner race has an indentation 79 forming an inclined plane confronting each roller 76 so that it is possible for the shaft 48 to rotate in the same direction as it is driven at a rate more rapid than the driving rate transmitted through the sprocket 74.

FIGURE 3 diagrammatically illustrates the driving mechanism for the roller bed 20. A main drive unit 94 is mechanically coupled to a main drive shaft 96, the position of which relative to the roller bed 20 is illustrated in FIGURE 2. The main drive shaft 96 extends parallel to the roller bed 20 at one side thereof, and a plurality of section drive units are mechanically coupled to the main drive shaft 96. The first of these drive units, designated 98, couples the main drive shaft 96 to the loading section 34 and the rollers 37A of the loading section 36. In this manner, the first drive unit transfers power from the main drive shaft 96 to the loading sections 34 and 36.

The furnace region 30 of the roller bed 20 contains two furnace sections 38 and 104 which are driven from the main drive shaft 96 by a second drive unit 100 and a third drive unit 102. The furnace region 30 also contains six speedup sections, referred to as quench speedup sections, designated 105, 106, 107, 108, 109, and 110, and these sections are disposed in sequential order between the furnace section 104 and the door 42 between the furnace region 30 and the quench region 32. The roller bed section 105 is mechanically coupled to the main drive shaft 96 through a fourth drive unit 112. The section 106 is driven by a fifth drive unit 114 which is coupled thereto and to the main drive shaft 96.

In like manner, the quench speedup section 107 is driven by a sixth drive unit 116, and the section 108 is driven by a seventh drive unit 118. Also, the quench speedup section 109 is driven by an eighth drive unit 120, and the section 110 is driven by a ninth drive unit 122 from the main drive shaft 96.

The quenching region 32, or quenching section, of the roller bed 20 is mechanically coupled to the main drive shaft 96 through a tenth drive unit 128. The unloading region or section 33 is coupled to the main drive shaft by an eleventh drive unit 130.

The first section 34 of the loading region 28 of the roller bed 20 is also provided with a separate loading drive unit 136 which has a shaft 138 which is mechanically coupled to the first drive unit 98. The loading drive unit 136 permits the section 34 of the loading region 28 of the roller bed 20 to translate a work piece or charge independent of the furnace section 38 or other sections of the roller bed 20.

FIGURE 1 illustrates drive means 98A, 100A, 102A, 104A, 112A, 114A 116A, 118A, 120A, 122A, 128A, and 130A for the sections 34, 36, 38, 104, 105, 106, 107, 108, 109, 110, 32 and 33, respectively. These drive means correspond to the drive units 98, 100, 102, 104, 112, 114, 116, 118, 120, 122, 128, and 130 and may comprise these units. These drive means may also, however, be direct current electrical motors. The General Electric Company's "Amplidyne" is an example of a motor suitable for service in this apparatus.

FIGURE 4 is a plan view of the main drive unit 94 which includes an emergency engine 140 and an electric motor 142 which provides power for normal operation. The electric motor 142 is mounted on a frame 144 and coupled to a transmission 146 through a shaft coupler 148. The transmission 146 is provided with a gear shift mechanism and lever 150, which permits the selection of the different gear ratios. The transmission 146 is coupled to a gear box 152 through a coupler 154.

The shaft of the electric motor 142 is also coupled to a tachometer generator 156 for indicating motor rate and a second generator 158 in the motor control system. The tachometer generator 156 indicates the rotation rate of the motor 142, and by means of a knowledge of the gear ratios which may be selected in the transmission 146, the rate of translation of the work piece may be determined from the tachometer generator 156.

The emergency engine 140 is driven by a source of liquid petroleum gas such as propane, not shown, which may be started on the failure of electric power. This engine 140 is connected to a shaft 172 which is connected to a clutch 160 through a shaft coupler 162. The shaft 172 is mounted between two bearings 164 and 166, and carries the clutch 160. A pulley wheel 168 is mounted on the clutch 160 and rotates therewith. The clutch 160 is provided with a clutch lever mechanism 170 which couples the shaft 172 to the pulley wheel 168. The pulley wheel 168 is aligned with the second pulley wheel 174 mounted between the shaft coupler 148 and the transmission 146. The two pulley wheels 168 and 174 are coupled together by a drive belt 176.

In the event of power failure to the electric motor 142, the engine 140 may be started, and the clutch lever mechanism 170 actuated to couple the shaft 172 to the pulley wheel 178, and hence to the pulley wheel 174. In this manner, drive may be applied to the driven shaft of the transmission 146 so that a work piece on the roller bed 20 will not be permitted to come to rest.

The output shaft of the gear box 152, designated 178, has a pair of parallel sprockets 180, which engage a chain 182. The chain 182 engages a second pair of sprockets 184 mounted on the main drive shaft 96, thereby transmitting power to the main shaft 76.

The quench drive unit 132 is illustrated in detail in FIGURE 6. This unit utilizes an electric motor 186 which is coupled to a reducer 188 for reducing the speed of the motor 186 through a shaft coupler 190. The driving shaft of the reducer 188 is connected to the quench drive shaft 134 and to an extension shaft 134A which serves the same function as the quench drive shaft 124.

The fourth drive unit 112, fifth drive unit 114, sixth drive unit 116, seventh drive unit 118, eighth drive unit 120, and ninth drive unit 122 are of identical construction and are illustrated in FIGURES 7 and 7A. Each of these units is constructed on a frame 192 and has a sprocket 194 which is coupled to the main drive shaft 96 through a chain 196. The sprocket 194 is mounted on the driven shaft of a gear box 198, and the driving shaft of the gear box 198 is connected to a clutch 200. The clutch 200 is also connected to a sprocket 202 through a shaft coupler 204, and the sprocket 202 is mounted on a shaft 205 journaled on shaft bearings 206 and 208. The sprocket 202 is also connected to a second gear box 210 through a one-way clutch 212, and the second gear box 210 is connected to a sprocket unit 214. The sprocket unit 214 has thereon a sprocket 216 which is coupled through a chain 218 to the quench drive shaft 134 by means of sprockets 135 mounted on the quench drive shafts 134.

The clutch mechanism 200 combines a one-way clutch 220 with a disc clutch 222 which in its locked position overcomes the one-way clutch. As indicated in FIGURE 7A, the one-way clutch has an inner race 224 which is mounted on the driven shaft 226 of the gear box 198. The one-way clutch 220 also has an outer race 228 which is mounted rotatably about the inner race 224 by a pair of ball bearing assemblies 230. The one-way clutch 220 is constructed in the manner of Patent No. 3,017,002 of Joseph A. Marland, entitled One-Way Clutch, and has a plurality of rollers 232 disposed between the inner and outer races to wedge between these races for rotational torques in one direction and rotate between the races for rotational torques in the reverse direction.

The outer race 228 has a hub 234 which is coupled to a sleeve 236 disposed within the hub 234 by meshed teeth 238. The sleeve 236 is mounted on a shaft 240 at one end and mounted on the coupler 204 at the opposite end. In this manner, the outer race is directly connected to the coupler 204 and hence to the sprocket 202 which is used to drive the roller bed 20. The teeth 238 are for the purpose of compensating for slight shaft misalignment between the shaft 240 and the shaft 226 of the gear box 198.

If the shaft 226 of the gear box 198 is rotating in the free wheeling direction, the inner race 224 will rotate freely within the outer race 228, and the rollers 232 will revolve but force will not be transmitted to the sprocket 202. However, if the shaft 226 of the gear box 198 is rotating in the opposite direction, torque will be transmitted through the one-way clutch 220 to drive the sprocket 202. The disc clutch 222 is for the purpose of permitting torque to be transmitted from the shaft 222 to the sprocket 202 in the free wheeling direction.

The disc clutch 222 has a rim 242 which is mounted upon an outwardly extending flange 244 attached to the outer race 228 of the one-way clutch 220. The rim 242 has a disc-shaped brake lining 246 extending inwardly therefrom, and this disc 246 is disposed between a pair of plate-shaped brake shoes 248 and 250. The brake shoe 248 is a portion of a sleeve 252 which is mounted on the driven shaft 226 of the gear box 198 and is rotatable with the shaft 226. The brake shoe 250 has a cylindrical surface slidably disposed about the sleeve 252.

A sleeve 254 is also mounted on the driven shaft 226 between the sleeve 252 and the gear box 198, and this sleeve carries a pair of pins 256 on opposite sides thereof which are pivotally mounted on a yoke 258. The yoke 258 is mounted on a handle 260 which is pivoted at one end of the frame 192, so that force applied to the opposite end of the handle translates the sleeve 254 along the shaft 226. The sleeve 254 carries a plurality of actuating pawls 262 which engage the brake shoe 250 and force the brake lining disc 246 between the brake shoes 248 and 250. In this manner, the disc clutch 222 locks the outer race 228 of the one-way clutch 220 on the shaft 226.

The one-way clutch 212 is of similar construction to the one-way clutch 220 and also may be constructed in the manner of the above referred to patent by Joseph A. Marland. The disc clutch 222 may be of the type manufactured by the Edgemont Machine Company of Dayton, Ohio and illustrated in its bulletin SF-7.

The sprocket unit 214 contains a pneumatic clutch 264. The sprocket 216 is mounted on a sleeve 266 and is rotatable therewith, the sleeve having a disc 268 attached thereto and a pin 270 extending between the sprocket 216 and the disc 268. The sleeve 266 is rotatably disposed about a cylinder 272 which is mounted on the driven shaft 274 of the gear box 210 and rotates with the shaft 274. The shaft 274 also extends into the pneumatic clutch 264. A sleeve 276 which is disposed within the sleeve 266 and attached thereto also extends into the pneumatic clutch 264. The sleeve 276 and the shaft 274 are coupled together as a result of air pressure entering the pneumatic clutch 264 through a tube 278, and are free to rotate relative to each other in the absence of pressurized air. Pneumatic clutches suitable for clutch 264 are commercially available, and a pneumatic clutch will be described hereinafter.

FIGURE 8 illustrates the details of the construction of the tenth drive unit 128 and eleventh drive unit 130 which are used to drive respectively the quenching region or quench table 32 and the unloading region or unloading table 33. The main drive shaft 96 is coupled to a sprocket 280 through a chain 282, and the sprocket 280 is mounted on a driving shaft 284 of a speed reducing gear box 286 through a pneumatic clutch 288. The construction of of the pneumatic clutch 288, and the sprocket assembly including the sprocket 280 are identical to the construction of the pneumatic clutch 264 and its sprocket assembly. A one-way clutch 290 is mounted between the gear box 286 and a sprocket 292. The sprocket 292 is mounted on a shaft 294 between bearing assemblies 296 and 298. The shaft 294 is connected to a locking one-way clutch assembly 300 which is provided with a pneumatic locking means. The locking one-way clutch assembly 300 is connected through speed reducing gear box 302 to a pneumatic clutch and sprocket assembly 304. The construction of the pneumatic clutch and sprocket assembly 304 is identical to the pneumatic clutch and sprocket assembly 264. The sprocket 304 of the tenth drive unit 128 is connected to the quench drive shaft 134 through a chain 308, while the sprocket 306 of the eleventh drive unit 130 is connected to the quench drive shaft 134A through a chain 308A and sprocket 309, as illustrated in FIGURE 6.

As illustrated in FIGURES 8 and 12, the driven shaft 310 of the gear box 302 is mounted on the inner race 312 of the locking one-way clutch assembly 300. The one-way clutch also has an outer race 314 which is coupled to the inner race 312 by means of a plurality of rollers 316, as in the case of the one-way clutch of the patent of Joseph A. Marland referred to above. A circular hub 318 is also mounted coaxially on the outer race 314 and provided with teeth which are meshed with teeth of an inner sleeve 320. The inner sleeve 320 is mounted on a shaft 322 which is connected to the shaft 294 through a coupler 324. The shaft 294 carries the sprocket 292, and the sprocket 292 carries a chain 326 which couples the drive unit to the section 32 or 33 of the roller bed 20.

The outer race 314 of the locking one-way clutch assembly 300 also has a drum 328 disposed coaxially thereabout, and the drum 328 confronts a brake lining 330 disposed coaxially thereabout. A pneumatic tube 332 is also coaxially disposed about the brake lining 330 and separated from the brake lining 330 by a flexible ring 334. The pneumatic tube 332 is connected to a source of compressed air, to be described hereinafter, through a tube 336 which extends to a chamber 337 which surrounds the shaft 310. When the pneumatic circular tube 332 receives compressed air, the brake lining 330 is compressed between the flexible ring 334 and the drum 328 affixed to the outer race 314, thereby locking the pneumatic tube 334 with the outer race 314. A hub 338 is mounted on the shaft 310 of the gear train 302 and rotates therewith. The tube 336 extends through the hub 338 to the chamber 337, and the chamber 337 communicates with an axial channel 340 within the shaft 310 to provide an air inlet through the end of the shaft 310, designated 342 in FIGURE 8. The air inlet 342 is connected to a stationary tube 343 and forms a rotating seal to the shaft 310.

FIGURE 5 illustrates the construction of the first drive unit 98 which is utilized to drive the loading section 34 of the roller bed 20. The first drive unit 98 has a sprocket 344 which is mounted on a shaft 346 and supported by a pair of bearing assemblies 348 and 350. The sprocket 344 is coupled to the rollers of the roller bed 20 of the loading sections 34 and 36 by a chain 352.

The shaft 346 is connected to a locking one-way clutch assembly 354 through a shaft coupler 356. The locking one-way clutch assembly 354 is similar in construction to the locking one-way clutch assembly 300 illustrated on FIGURES 8 and 12, and will not be further described. A speed reducing gear box 356 has a driven shaft 358 which is connected to the locking one-way clutch 354, and a driving shaft 360 which is connected to an assembly of a sprocket 362 and a pneumatic clutch 364. The pneumatic clutch 364 and sprocket 362 form an assembly which is identical to the sprocket and clutch assembly 214 of FIGURE 7, and will not be further described.

The first drive unit 98 also has a separate two-speed electric motor 366 which is connected through a speed reducing gear box 368 to a shaft 370. The shaft 370 carries a sprocket 372 which is coupled to a sprocket 374 through a chain 376. The sprocket 374 is a part of a pneumatic clutch and sprocket assembly, the pneumatic clutch being designated 378, and the pneumatic clutch and sprocket assembly is connected through a speed reducing gear box 380 and a one-way clutch 382 to the shaft 346. In this manner, the second electric motor 366 is coupled to the sprocket 344 and may be utilized to translate a charge onto the roller bed 20 in the loading section 34.

The second and third drive units 100 and 102 are illustrated in FIGURE 9. These drive units 100 and 102 have a sprocket 384 which is connected to the roller bed 20 by means of a chain 386. Also, the sprocket 384 is mounted on a shaft 388 between a pair of bearing supports 390 and 392, and is coupled to a second sprocket 394 through a speed reducing gear box 396 and a shaft coupler 398. The sprocket 394 is connected to a sprocket 399 on the main drive shaft 96.

FIGURE 10 schematically illustrates the entire drive mechanism for the roller bed 20 and includes the control system for the pneumatic clutches and the pneumatic locking one-way clutches. A compressed air source 401 is illustrated as connected to each pneumatic clutch and pneumatic locking one-way clutch of the drive units through separate valves to be referred to hereafter.

The dimensions of the different sections of the roller furnace will aid in understanding its operation. In the particular construction described throughout this specification, section 34 of the loading section 28 is approximately 80 feet long and the portion of section 36 containing the free wheeling rollers 36A is 18 feet long while the idler roller 36C takes up 2 feet. The loading section 28 can receive charges up to 100 feet in length. Section 36 of the loading table 28 consists of 9 free wheeling rollers 37A, one idler roller 37C, and one roller 37B driven with the furnace section 38, and this section 36 is thus a total of 20 feet in length. The furnace 30 has sections 38 and 104 which are 63 and 60 feet in length, respectively, and sections 105, 106, 107, 108, and 109 are each 15 feet in length while section 110 is 18 feet in length. The quench section 32 has a length of 106 feet and the unloading section 33 has a length of approximately 100 feet.

A charge in the form of a sheet of aluminum, glass or other material to be heat treated having a length between 12 and 88 feet is first placed in the roller bed of the loading section 28 by a mechanical work moving device, such as a fork truck. The charge is under the control of the first drive unit 98, illustrated in FIGURE 5, and hence it may be driven either by the main drive shaft 96 or loading section motor 366.

The locking one-way clutch 354 transmits torque from the main drive shaft 96 to the sprocket 344 only in the forward direction unless locked. At the same time, the one-way clutch 382 will transmit torque from the shaft 370 to the sprocket 344 only in the forward direction and at a rate in excess of that delivered by the locking one-way clutch 354. A work piece may be translated in the forward direction on the roller bed 20 either by actuating the valve 400 to the air clutch 378 and operating the loading motor 366, or by actuating the valve 402 to the air clutch 364 and transmitting torque from the main drive shaft 96. If both air clutches 364 and 378 are engaged, the sprocket 344 will be driven in the forward direction by the main drive shaft 96 or the shaft 370 depending upon which of the two shafts is rotating at the highest rate in the forward direction. In the event it is desired to reverse the direction of the work piece in the sections 34 of the roller bed 20 to remove a jam or the like, the locking one-way clutch 354 is engaged by means of the valve 404 and the direction of rotation of the main drive unit 94 is reversed. For reversal of direction, the air clutch 378 must also be disengaged by actuating the valve 400 thereto in order to prevent the motor 366 from controlling the rotation direction.

The loading section 34 must not only provide a convenient mechanism for introducing sheets of material to be treated, but must also accurately space the leading edge of the work piece being introduced from the trailing edge of the preceding work piece. The spacing between adjacent charges in the furnace 30 must vary depending on the length and thickness of the charge. Longer, thicker charges travel slower in the furnace 30 in order to obtain adequate exposure to the sheet in the furnace, and these charges may be spaced by a smaller distance than the lighter, thinner charges which travel more rapidly within the furnace. It is to be noted that the furnace here disclosed is intended for processing charges having lengths from 10 to 88 feet and thicknesses varying from a small fraction of an inch to several inches.

The gap, or spacing, between the trailing edge of the preceding work piece and the leading edge of a work piece about to be introduced into the furnace 30 is necessary in order to remove the preceding work piece from the furnace without interrupting the continuous progress of the work piece to be introduced into the furnace. As will be more fully described in connection with the description of the speed-up sections 104 through 110 of the furnace, this gap or spacing is made the minimum distance which will assure adequate time for removal of the preceding charge from the furnace 30, and thus maximize furnace capacity. In the particular construction described throughout this specification, the minimum gap between work pieces is 12 inches, since shorter distances may not be practical to obtain proper unloading of the furnace.

The rollers 26 of section 34 and the free wheeling rollers 37A of section 36 are driven as a unit by the first drive unit 98, as indicated above, and hence the rollers 26 of section 34 cannot be stopped from rotating until the trailing edge of the preceding work piece is totally disposed on the rollers 37A and is under control of the roller 37B of the section 36 and the rollers 26A of the furnace section 38. When this condition exists, the air clutches 378 and 364 may be opened and the rollers 26 stopped to receive a new charge. The preceding charge will be translated from the section 36 due to the drive in the furnace section rollers 26A and roller 37B, since the rollers 37A are free wheeling in the forward direction and the roller 37C is an idler roll.

The rollers 26 may not be powered in the forward direction by the loading motor 366 at a speed in excess of that supplied by the furnace drive until the trailing edge of the preceding charge is supported by the idler roller 37C. When this event occurs, the air clutch 378 is closed and the loading motor 366 actuated to rapidly translate the new work piece toward the preceding work piece in order to establish the proper gap. In practice, the proper gap is most readily achieved by translating the new work piece into abutment with the preceding work piece, that is, causing the leading edge of the new work piece to approximately strike the trailing edge of the preceding work piece while the trailing edge of the preceding work piece is disposed in the region of the idler roller 37C. Thereafter, the loading motor 366 is deactuated and the new work piece is permitted to lie at rest until the preceding work piece progresses to the proper gap or separation. At the moment the preceding work piece has progressed to achieve the proper gap between the trailing edge of the preceding work piece and the leading edge of the new work piece, the air clutch 364 of the drive unit 98 is closed, thus bringing the rollers 36 and 37A under control of the main drive unit and causing the new work piece to proceed into the furnace 30 at the same rate as the preceding work progresses through the furnace 30.

After the charge leaves the loading region 28 of the roller bed 20, it may be driven forward at an increasing or decreasing rate or reversed in accordance with the control of the main drive motor 142, but in the absence of a jam, the charge conventionally travels at a constant rate through the furnace sections 38 and 104. Processing of most materials require this translation rate to be closely held to a fixed value for best results.

When a work piece is ready to leave the furnace 30, it is desirable to accelerate the work piece in order to transfer it to the quench region 32 as soon as possible, and the sections 106, 107, 108, 109, and 110 of the furnace 30 are designed for this purpose. The charge must be transferred from the furnace 30 to the quench region 32 as soon as possible to prevent the charge from losing physicals and to provide time in the quench region for processing the charge.

In addition, these speed up sections remove a charge from the furnace during the period the following charge travels a distance approaching the gap between work pieces.

In these sections, the drive units 112, 114, 116, 118, 120, and 122 control the motion of the work piece. The mechanically locking one-way clutches 200 are generally in the unlocked condition, so that only drive in the forward direction is applied to the roller bed 20 controlled by each of these drive units. The work piece may be speeded up in any of these sections by engaging the pneumatic clutch 264 by closing the valve 406 connected thereto, thereby coupling the quench drive shaft 134 to the one-way clutch 212 of a given drive unit. If the clutch drive shaft 134 is raised in speed, it will overcome the speed of the main drive shaft 96 and take over control of the work piece in that part of the roller bed 20. It is to be noted that this transfer of control from the main drive shaft 96 to the quench drive shaft 134 is achieved without jerk and without reversal of direction of any of the sprockets or the chains controlling these sprockets. Should it be desirable for any reason, such as a jam, to reverse the direction of the work piece in the quench speed up region, this may be done by mechanically locking the locking one-way clutch 200 of a given drive unit and reversing the direction of rotation of the main line shaft 96. This is accomplished by movement of the handle 260 thereof.

While reversal of direction in the quench speed-up region is not common, reversal of direction in the quench table region is almost necessary in all cases, and hence drive unit 128 is designed for this purpose. For that reason, a locking one-way clutch 300 is provided between the quench drive shaft 134 and the sprocket 292 which drives the roller bed 20, and this locking one-way clutch 300 is pneumatically controlled by a valve 408. Also the pneumatic clutch 304 controls the coupling to the quench drive shaft 134. The work piece may be translated in both the forward and reverse directions and may be oscillated within the quench table region when the pneumatic clutch 304 and locking one-way clutch 300 are subject to air pressure. It is to be noted that the one-way clutch 290 of each of the drive mechanisms in the quench table regions 128 and 130 permits drive from the main drive shaft 96 only in the forward direction. It is necessary to open air clutch 288 by opening valve 410 to drive unit 128 in order to reverse the direction of the charges in order to decouple one-way clutch 290 from the main drive shaft 96. Further, it is to be noted that the locking one-way clutches 300 also transmit drive from the quench drive shaft 134 in the forward direction, and it is only when the pneumatic clutch of the locking one-way clutch 300 is engaged that drive in the reverse direction may be transmitted from the quench drive unit 132.

It is to be noted that six speed up sections 105, 106, 107, 108, 109, and 110 have been provided, each approximately 15 feet in length and disposed within the furnace 30. The final speed up section 110 is always used to remove a charge from the furnace and as many preceding speed up sections 109, 108, etc. are used as required to support the entire charge. In this manner, as much of the entire length of the furnace 30 as possible is utilized for heating work pieces, including the speed up sections 105, 106, 107, 108, 109 and 110. Speed up of a charge cannot occur until the charge has left sections 38 and 104, since the quench drive unit has no control over sections 38 and 104 and the main drive unit 94 cannot be accelerated due to the fact that succeeding charges in sections 38 and 104 are not to be accelerated.

Assume a charge is 12 feet long and can thus be totally disposed on any one speed up section. When the trailing edge of this charge has entered section 110, the charge will be accelerated under the control of the quench drive unit 122 to remove the charge from the furnace 30. A preceding charge is in the usual case being powered in the quench region 32 under control of the quench drive unit 132, or the main drive unit 94 at the operator's option, so that this charge remains under control of the main drive unit 94 and continues to soak in the furnace 30. Most charges are not harmed by additional soaking time, unless they are clad charges. Two or more charges can be processed in the speed up sections 105, 106, 107, 108, 109, and 110 under control of the main drive unit 94. After the quench drive unit 132, or the main drive unit 94 at the option of the operator, has delivered the preceding charge from the quench region 32 to the unloading region 33, valves 406 for the speed-up section of the trailing edge of the charge and all proceeding speed-up sections are closed and the quench drive unit 132 is speeded up to assume control of the charge and translate to the quench region 32. As soon as the trailing edge of a charge leaves a section, the valve 406 for the drive unit of that speed-up section is immediately opened to place that section under control of the main drive unit 94 so that the following charge can progress at a constant rate.

When a charge has been translated onto the unloading region 33, it may remain only until the next charge is ready to be removed from the quench region 32. To do so, valve 406 of the air clutch 304 of drive unit 130 must be closed to decouple the roller table in the unloading section from the quench drive unit 132, and air clutch 288 of this unit must also be disengaged by closing valves 410 to decouple the main drive unit 94. The charge is removed from the unloading region by a lift truck, or the like. Since a charge must clear the length of the accelerated speed up section (L) at an average rate (R) during the time the succeeding charge is covering the gap (D) between charges at the constant rate $R_o$ of the main drive unit, the ratio $L/R$ must be less than the ratio $D/R_o$, thus dictating the gap length. Further, since thin light materials can be run at a higher rate ($R_o$), the gap (D) must be greater for these materials.

The gap between successive charges is necessary to permit the first accelerated speed up section to accelerate a charge and return to the constant rate of the main drive shaft before the subsequent charge reaches this section.

Figure 11:
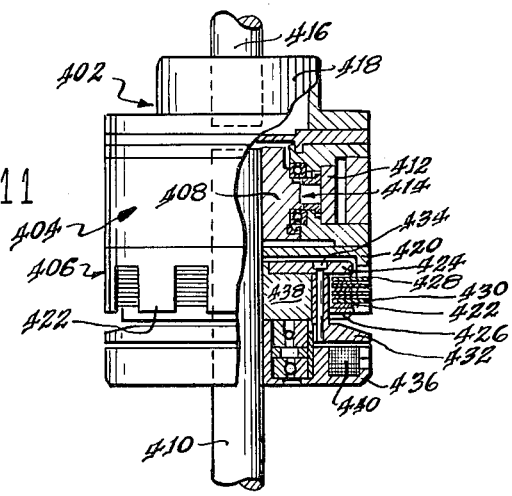
FIGURE 11 is a view of an alternate construction for a locking one-way clutch, partly shown in elevation and partly shown in section.

The control system for the drive mechanism described above has been pneumatic, but it is to be understood that it may also be electrical. Electrical clutches are available for use in the combination clutch and sprocket assemblies, such as the clutch and sprocket assembly 378 illustrated in the loading drive mechanism of FIGURE 5, and these are listed in the catalog of the Bendix Corporation entitled "Bendix Elmag Clutches and Brakes," Electro-Magnetic Multiple Disc, Bulletin EM2000. FIGURE 11 illustrates a one-way clutch provided with an electrical lock suitable for use in place of the locking one-way clutches 300 in the drive units 128 and 130, or the locking one-way clutch of FIGURE 11, or the locking one-way clutch 300 of FIGURE 8, could be used as a substitute for the locking one-way clutch 200 which is used in the clutch speed-up drive units 112, 114, 116, 118, 120, and 122.

The locking one-way clutch of FIGURE 11 is designated 402 and has a one-way clutch portion 404 and a magnetic clutch 406. The one-way clutch 404 has an inner race 408 which is mounted on one shaft 410 and rotates therewith. The one-way clutch 404 also has an outer race 412 which is mechanically coupled to the inner race through a plurality of rollers 414. The outer race 412 is connected to a shaft 416 by means of a hub 418. For rotational torques in one direction applied to the shaft 410, the one-way clutch 404 rotates freely, while rotational torques in the reverse direction cause the one-way clutch 404 to transmit power to the shaft 416.

The magnetic clutch 406 has a disc 420 which is mounted on the outer race 412 of the one-way clutch 404 and has a plurality of depending fingers 422 at spaced intervals. A disc 424 is disposed within the fingers 422 and also has a plurality of depending fingers 426 which extend therefrom parallel to the fingers 422. The fingers 422 support a first group of brake discs 428, and the fingers 426 support a second group of brake discs 430 which are sandwiched between the brake discs 428. The disc 424 is mounted on a magnetic plate 432 by means of bolts 434 and the magnetic plate is mounted adjacent to a field piece 436 which is stationary, that is, it does not rotate with either of the shafts 410 or 416. The plate 432 rotates with the disc 424, and both of these members are mounted on a hub 438 which is mounted on the shaft 410.

The stationary field piece 436 has a helical coil 440 therein, and when electric current is applied to the helical coil 440, the magnetic plate 432 is attracted toward the stationary field piece 436, thus causing the disc 424 to be translated toward the stationary field piece 436 also and wedging the brake discs 428 between the brake discs 430. In this manner, the hub 438 is locked to the outer race 412 of the one-way clutch 404, and since the hub 438 and inner race 408 of the one-way clutch 404 are both mounted on the shaft 410, the outer race and inner race are locked together.

Since the trailing edge of each charge controls operation of the roller bed furnace in accordance with the present invention, it is necessary to sense at all times the position of the trailing edge of each charge, or at least note translation of the trailing edge from one section of the roller bed to another.

For this purpose, a continuous chain 412, diagrammatically illustrated in FIGURE 1 and shown in FIGURE 2, is mounted on the opposite side of the roller bed 20 from the drive shafts 96 and 134, and an indicator 414 is mounted on the chain 412 in alignment with the trailing edge of each charge as it enters the furnace door 40. The chain 412 is driven by sprockets 416 mounted on the axial shafts 48 of the rollers and accurately maintains synchronism with the charge as it traverses the roller bed 20.

Further, position sensors 420, 422, 424, 426, 428, 430, 432, 434, and 436 are mounted on the roller bed foundation or wall 22A and provided with actuating arms 438 for engaging the indicator 414. The position sensors may be utilized with automatic means for actuating the valves for transferring control from the quench drive unit 132 to the main drive unit 94, or merely to operate an alarm or light to notify the operator that this can be done. The position sensors may be pneumatic valves or electrical switches. In the embodiment illustrated the sensors are electrical switches, and each switch actuates a lamp 438.

In one particular construction of a drive mechanism or roller hearth furnace in accordance with the present invention, the main drive motor 142 and the quench drive motor 186 are both 25 horse power reversible electric motors. The loading motor 366 is a 5 horse power A.C. two speed motor which only operates in the forward direction. In this particular construction, the electric motors 186 and 142 are capable of operation over a speed range of 20 to 1, and the transmission 146 of the main drive unit 194 is capable of producing a speed change over a ratio of 18 to 1 so that the work piece may be varied over a range of speeds of 360 to 1. Further, the speed regulation of the roller bed 20 is maintained within one percent of the set speed.

Those skilled in the art will devise many modifications and improvements on roller hearth drive mechanisms within the spirit of the present invention. Further, those skilled in the art will apply the present invention to apparatus other than here set forth. It is therefore intended that the scope of the present invention be not limited by the foregoing disclosure, but rather only by the appended claims.

The invention claimed is:

1. A drive mechanism for a roller bed having a plurality of rollers rotatably mounted in parallel adjacent relationship comprising a first variable speed motor, a first one-way clutch connected to the first motor and to the roller bed to drive the rollers in one rotational direction, said first one-way clutch having an inner race, an outer race, a plurality of members disposed between inner and outer races, and means for wedging the members between the races for rotational torques applied in the one rotational direction, said means permitting the members to slip between the inner and outer races for rotational torques applied in the reverse direction, a second variable speed motor, and a second one-way clutch connected to the second motor and to the roller bed to drive the rollers in said rotational direction, said second one-way clutch having an inner race, and outer race, a plurality of members disposed between the inner and outer races, and means for wedging the members between the races for rotational torques applied in the one rotational direction, said means permitting the members to slip between the inner and outer races for rotational torques applied in the reverse direction.

2. A drive mechanism for a roller bed having a plurality of rollers rotatably mounted in parallel adjacent relationship and disposed in two adjacent sections, the rollers in each section being mechanically coupled together for rotation in the same direction at the same rotational rate, a first variable speed drive means, a second variable speed drive means, a first one-way clutch connected between the first drive means and the first section for driving said section in one rotational direction, a second one-way clutch connected between the first drive means and the second section for driving the second section in the said rotational direction, a third one-way clutch connected between the second drive means and the first section for driving the first section in said rotational direction, and a fourth one-way clutch connected between the second drive means and the second section for driving the second section in said direction, each of said one-way clutches having an inner race, an outer race, a plurality of members disposed between the inner and outer races, and means for wedging the members between the races for rotational torques applied in the said rotational direction between the races, said means permitting the members to slip between the inner and outer races for rotational torques applied in the reverse direction.

3. A drive mechanism for a roller bed having a plurality of rollers rotatably mounted in parallel adjacent relationship and disposed in a plane to form a plurality of adjacent sections, the rollers in each section being mechanically coupled together for rotation in the same direction at the same rotational rate, comprising a first variable speed motor, a second variable speed motor, a plurality of drive units, each drive unit being mechanically coupled to one of the sections and having a first one-way clutch mechanically connected between the first motor and said section of the roller bed and a second one-way clutch mechanically connected between the second motor and said section of the roller bed, said first and second one-way clutches of each drive unit transmitting rotational torque in one direction to the section of the roller bed driven by said drive unit and free wheeling for rotational torque in the reverse direction.

4. A drive mechanism for a roller bed comprising the elements of claim 3 wherein the first motor is reversible and wherein the first one-way clutch includes means for mechanically locking the clutch to transmit torque in either direction.

5. A drive mechanism for a roller bed comprising the elements of claim 4 in combination with a clutch mechanically connected between the first one-way clutch and the first motor.

6. A drive mechanism for a roller bed comprising the elements of claim 4 in combination with a clutch mechanically connected between the second one-way clutch and the second motor.

7. A drive mechanism for a roller bed comprising the elements of claim 3 wherein the first and second one-way clutches comprise an inner race, an outer race, a plurality of members disposed between the inner and the outer races, and means for wedging the members between the races for rotational torques applied in one direction between the races, said means permitting the members to slip between the inner and outer races for rotational torques applied in the reverse direction.

8. A drive mechanism for a roller bed comprising the elements of claim 7 wherein the first motor is reversible, and the first one-way clutch includes electromechanical means for locking the inner race to the outer race to permit the first one-way clutch to transmit torques in both directions.

9. A drive mechanism for a roller bed comprising the elements of claim 7 wherein the first motor is reversible and the first one-way clutch includes a pneumatically actuated means for locking the inner race on the outer race to permit the first one-way clutch to transmit torques in both directions.

10. A drive mechanism for a roller bed comprising a first variable speed motor, a first one-way clutch connected to the first motor and to the roller bed to drive the rollers in one rotational direction, a second variable speed motor, a second one-way clutch connected to the second motor and to the roller bed to drive the rollers in said rotational direction, the first and second one-way clutches having an inner race, an outer race, and a plurality of members disposed between the inner and outer races, and means for wedging the members between the races for rotational torques applied in said rotational direction and permitting the members to slip the inner and outer races for rotational torques applied in the reverse direction, and a gear box connected between the first motor and the first one-way clutch, said gear box having a driven shaft and a driving shaft and means to select one of a plurality of gear ratios between the driven shaft and the driving shaft.

11. A roller hearth furnace comprising a bed of adjacent parallel rollers extending in sequence from a loading section through a furnace section, a speed-up section, and a quench table, the rollers in each of said sections being mechanically coupled together for rotation at the same rate and in the same direction, a main drive shaft extending adjacent to the roller bed, a reversible variable speed main drive unit mechanically coupled to the main drive shaft, a first drive unit mechanically coupled between the main drive shaft and the loading section including a first one-way clutch connected between the main drive shaft and the loading section to transmit torque in one direction to the loading section, and a second one-way clutch connected to the loading section of the roller bed to transmit torque in the same direction as the first one-way clutch, a loading motor connected to the second one-way clutch for translating a work piece at a higher rate than the rate of the main drive unit, and additional drive units coupled to the main drive shaft for coupling the main drive shaft to each of the other sections of the roller bed, each additional drive unit being coupled to a different section of the roller bed.

12. A roller hearth furnace comprising the elements of claim 11 in combination with a first clutch mechanically connected between the first one-way clutch of the first drive unit and the main drive shaft, and a second clutch mechanically connected between the second one-way clutch and the loading motor.

13. A roller hearth furnace comprising an unbroken bed of adjacent parallel rollers extending in sequence from a loading section through a furnace section, a speed-up section, and a quench table, the rollers in each of said sections being mechanically coupled together for rotation at the same rate and in the same direction, a main drive shaft extending adjacent to the sections of the roller bed, a reversible variable speed main drive unit mechanically coupled to the main drive shaft, a quench drive shaft rotatably mounted adjacent to the speed-up section and the quench table, a reversible variable speed quench drive unit mechanically coupled to the quench drive shaft, a first drive unit mechanically coupled to the speed-up section of the roller bed, said first drive unit having a one-way clutch connected between the roller bed and the main drive shaft and a second one-way clutch mechanically connected between the roller bed and the quench drive shaft, the first one-way clutch including means for locking the clutch for transmittal of torque in both directions, and a second drive unit mechanically coupled to the quench table, said second drive unit having a first one-way clutch mechanically coupled to the main drive shaft and a second one-way clutch mechanically coupled to the quench drive shaft, the second one-way clutch having means for locking the clutch for transmittal of torques in both directions, and the second drive unit having a first clutch between the second one-way clutch and the quench drive shaft and a second clutch between the first one-way clutch and the main drive shaft.

14. A roller hearth furnace comprising the elements of claim 13 wherein each of the clutches is pneumatically actuated, in combination with a compressed air supply directed to each of the clutches.

15. A roller hearth furnace comprising the elements of claim 13 wherein each of the clutches is electrically actuated, in combination with an electrical power source, and means connecting the electrical power source to each of the clutches including an electrical switch connected between each clutch and the power source.

16. A roller hearth furnace comprising an unbroken roller bed extending in sequence from a loading section through a furnace section, a speed-up section, and a quench table, the rollers in each of said sections being mechanically coupled together for rotation at the same rate and in the same direction, a main drive shaft extending adjacent to the roller bed, a reversible variable speed main drive unit mechanically coupled to the main drive shaft, a first drive unit mechanically coupled to the main drive shaft and to the loading section including a first one-way clutch connected between the main drive shaft and the loading section to transmit torque in one direction to the loading section, and a second one-way clutch connected to the loading section of the roller bed to transmit torque in the same direction as the first one-way clutch, a loading motor connected to the second one-way clutch for translating a work piece at a higher rate than the rate of the main drive shaft, a second drive unit mechanically coupled between the furnace section and the main drive unit for translating a work piece on the furnace section at the rate of the main drive shaft and in either direction, a third drive unit having a one-way clutch mechanically coupled between the speed-up section and the main drive shaft for transmission of torque in the first direction, said one-way clutch being provided with means for locking said clutch for transmission of torque in either direction, a second one-way clutch mechanically coupled to the speed-up section for transmission of torque in said first direction, an actuable clutch mechanically coupled to the second one-way clutch, a quench drive shaft rotatably mounted adjacent to the quench speed-up section and the quench table, a quench drive unit mechanically coupled to the quench drive shaft for rotating said shaft, means coupling the quench drive shaft to actuable clutch of the second drive unit, a third drive unit mechanically coupled to the quench table, said third drive unit having a one-way clutch connected to the quench table and an actuable clutch connected between the first one-way clutch and the main drive shaft, said third drive unit having a second one-way clutch connected to the quench table and a second actuable clutch connected between the second one-way clutch and the quench drive shaft, the second one-way clutch having means for locking the clutch for transmission of torque in both directions and being adapted to transmit torque to the quench table in the same direction as the first one-way clutch of said third drive unit.

17. A roller hearth furnace comprising the elements of claim 16 wherein the speed-up section of the roller bed comprises a plurality of parts, each of said parts having interconnected rollers which are rotatable in the same direction at the same rate, and each of said parts being driven by the main drive shaft and the quench drive shaft through a separate drive unit constructed in the manner of the second drive unit.

18. A roller hearth furnace comprising the elements of claim 16 wherein the main drive unit includes a gear box having a plurality of gear ratios, and means for selecting one of said gear ratios.

19. A roller hearth furnace comprising a bed of adjacent parallel rollers extending continuously in sequence from a loading section through a furnace section, a speed up section, and a quench section, the loading section having an idler roller adjacent to the furnace section free to rotate in either direction and incapable of being powered, the rollers in the loading section remote from the furnace section being mechanically coupled together for rotation in the same direction at the same rate, the rollers in the furnace section being mechanically coupled together for rotation in the same direction at the same rate, the rollers in the speed up section being mechanically coupled together for rotation in the same direction at the same rate, and the rollers in the quench section being mechanically coupled together for rotation in the same direction at the same rate, a main drive shaft extending adjacent to the roller bed, a reversible variable speed main drive unit mechanically coupled to the main drive shaft, a first drive unit mechanically coupled between the main drive shaft and the loading section including a first one-way clutch connected between the main drive shaft and the loading section to transmit torque in one direction to the loading section, and a second one-way clutch connected to the loading section of the roller bed to transmit torque in the same direction as the first one-way clutch, a loading motor connected to the second one-way clutch for translating a work piece at a higher rate than the rate of the main drive unit, and additional drive units coupled to the main drive shaft for coupling the main drive shaft to the furnace section, speed up section, and quench table.

20. A roller hearth furnace comprising the elements of claim 19 wherein the roller of the loading section immediately adjacent to the furnace section is mechanically coupled to the rollers of the furnace section for rotation in the same direction and at the same rate as the rollers in the furnace section, and the idler roller is immediately adjacent to said roller immediately adjacent to the furnace section.

21. A roller hearth furnace comprising the elements of claim 20 wherein a plurality of rollers of the loading section disposed immediately adjacent to the idler roller and on the side thereof remote from the furnace are mechanically coupled to the rollers of said loading section remote from the furnace section through one-way clutches, each of said plurality of rollers being driven in the same rotational direction as the rollers of said section remote from the furnace section and free wheeling in said rotational direction.

22. A roller hearth furnace comprising the elements of claim 19 wherein the bed of adjacent parallel rollers includes a plurality of separate speed up sections, each section having the rollers thereof independently coupled together for rotation at the same rate in the same direction, a speed up drive unit mechanically coupled to a speed up drive shaft, a separate one-way clutch mechanically coupled between the speed up drive shaft and each of the speed up sections for translating a charge in said section in the forward direction and a clutch mechanically coupled between the speed up drive shaft and each one-way clutch coupled to the speed up sections for disengaging the speed up drive shaft from the speed up sections.

23. A roller hearth furnace comprising the elements of claim 22 in combination with means for indicating the trailing edge of a charge as it is translated along the roller bed.

24. A roller hearth furnace comprising the elements of claim 22 in combination with a plurality of sensing units for detecting the passage of the trailing edge of a charge, said sensing units being disposed between the furnace section and the adjacent speed up section, between adjacent speed up sections, and between the final speed up section and the quench section.

25. A roller hearth furnace comprising a continuous bed of adjacent parallel rollers extending in sequence through a furnace section, a plurality of speed up sections, a quench section, and an unloading section, the rollers of each of the sections being mechanically coupled together independently of the rollers of other sections for rotation at the same rate and in the same direction, a main drive shaft extending adjacent to the roller bed, a variable speed main drive unit mechanically coupled to the main drive shaft, a quench speed up shaft extending adjacent to the roller bed, a variable speed quench speed up drive unit mechanically coupled to the quench speed up drive shaft, a plurality of first drive units mechanically coupled to the main drive shaft and to the quench speed up drive shaft, each of said first drive units being mechanically coupled to the rollers of one of the quench speed up sections and including a first one-way clutch mechanically coupling the first drive unit to the main drive shaft and a second one-way clutch mechanically coupling the first drive unit to the quench speed up shaft, the first and second one-way clutches being connected to transmit power to the roller bed in the direction of forward movement of the charge only, each of said first drive units including a disengaging clutch mechanically coupling the quench speed up drive shaft to the quench speed up section in series with the first one-way clutch, a second drive unit mechanically coupling the main drive shaft to the rollers of the furnace section, a third drive unit mechanically coupling the rollers of the quench section to the main drive shaft and to the quench speed up drive shaft, the third drive unit including a disengaging clutch and a one-way clutch mechanically connected between the rollers of the quench section and the main drive shaft and a disengaging clutch and a one-way clutch mechanically coupled between the quench speed up shaft and the rollers of the quench section, the one-way clutches of the third drive unit being connected to pass power to the roller table in the direction of forward movement of a charge on said table, and a fourth drive unit mechanically coupled to the rollers of the unloading section having a one-way clutch mechanically connected between one of the drive shafts and the rollers of the unloading section to drive said rollers in the direction of forward movement of a charge on the roller bed.

26. A roller hearth furnace comprising the elements of claim 25 including a plurality of means for sensing the trailing edge of a charge, one of said means being disposed to note the passing of the trailing edge between the furnace section and the first of the speed up sections, other of said means being positioned to note the passage of the trailing edge between successive speed up sections, another of said means being positioned to note the passage of the trailing edge between the final speed up section and the quench section, and still another of said means being positioned to note the passage of the trailing edge between the quench section and the unloading section.

27. The method of heat treating a plurality of charges of material to be treated in the form of elongated strips comprising the steps of placing the first charge on a stationary loading section of a continuous bed of parallel rollers with the axis of elongation of the charge normal to the rollers of the bed, rolling the first charge on the roller bed at a constant rate from the loading section and in a furnace section, placing a second charge on the stationary loading section, rolling the second charge at a rate higher than the constant rate of the first charge toward the first charge to position the leading edge of the second charge adjacent to and spaced from the trailing edge of the first charge by a gap, rolling the second charge in the furnace at said constant rate, and accelerating the first charge to remove said first charge from the furnace during the period the second charge travels the distance of said gap at said constant rate.

28. The method of heat treating a plurality of charges of material to be treated in the form of elongated strips comprising the steps of rolling on a continuous bed of parallel rollers a first and a second charge into a furnace section from a loading section with the axes of elongation of the charges normal to the rollers of the bed, the trailing edge of the first charge being spaced from the leading edge of the second charge by a gap, rolling the first and second charges through the furnace at a constant rate, rolling the first charge onto a speed up region within the furnace section, after the trailing edge of the first charge enters the speed up region accelerating the first charge on the speed up region to translate the first charge out of the furnace section during a shorter period of time than the period taken by the second charge to travel the distance of the gap between charges, and thereafter rolling the second charge onto the speed up region of the roller bed at said constant rate.

29. The method of heat treating a plurality of sheets of material comprising the steps of conveying said sheets from an entrance to an exit through a heat treating furnace at a common speed within a first range of speeds on a conveyor in a procession, the leading edge of each sheet being spaced from the trailing edge of the preceding sheet by a gap, accelerating a portion of the conveyor disposed within the furnace adjacent to the exit of the furnace to a speed above said range of speeds in response to the trailing edge of the leading sheet within the furnace entering said portion of the conveyor while maintaining all other sheets in said furnace at said common speed, translating said leading sheet on the conveyor from the furnace and restoring the speed of said portion of the conveyor to said common speed before the leading edge of the sheet following said leading sheet reaches said portions of the conveyor, removing the leading sheet from a second portion of the conveyor exterior of and adjacent to the exit of the furnace during the period required for the sheet following said leading sheet to be translated onto the first portion of the conveyor and translated to said second portion of the conveyor, and establishing the same translation rate in the second portion of the conveyor as the first portion thereof before the leading edge of said sheet following the leading sheet reaches said second portion of the conveyor.

30. The method of heat treating a plurality of elongated sheets of material comprising the steps of placing the first of said sheets on a stationary loading section of a roller bed conveyor with the longitudinal axis of the sheet normal to the axes of the rollers, rolling said first sheet onto a section of said conveyor disposed within a heat treating furnace at a constant rate, placing a second sheet on the stationary loading section with the longitudinal axis thereof normal to the axes of the rollers during the period the first sheet is being rolled into the furnace, before the trailing edge of the first sheet enters the furnace rolling the second sheet at a rate exceeding said constant rate toward the first sheet to position the leading edge of the second sheet at a gap from the first sheet, thereafter rolling the second sheet onto the furnace region of the conveyor at said constant rate, accelerating a speed up section of the roller bed conveyor when the trailing edge of the first sheet passes onto said speed up section to translate said first sheet to a succeeding section of the roller bed conveyor during the period the second sheet travels the distance of the gap, the length of the gap being approximately equal to the product of said constant rate and the time required for the speed up section to accelerate a sheet, translate the sheet from said speed up section and reestablish said constant rate.

31. The method of heat treating elongated sheets of material in a furnace having a plurality of independently driven roller conveyor sections extending through and disposed in the furnace comprising the steps of feeding said sheets sequentially into the furnace on said conveyor with the longitudinal axis of the sheets normal to the axes of the rollers of the conveyor and the trailing edge of each preceding sheet separated from the leading edge of each following sheet by a gap, rotating the rollers of all sections within the furnace at the same constant rate to translate the sheets through the furnace, accelerating the section adjacent to the exit of the furnace and the minimum number of adjacent sections required to carry the entire length of the most advanced sheet as soon as the trailing edge of said sheet enters the first of said sections to transport said advanced sheet from the furnace and decelerating said sections to the constant rate during the period the following sheet travels the distance of the gap.

References Cited by the Examiner
UNITED STATES PATENTS
2,056,510  10/1936  Fallon _____ 198—127 X GERALD M. FORLENZA, *Primary Examiner.*

HUGO O. SCHULZ, *Examiner.*

ROBERT G. SHERIDAN, *Assistant Examiner.*